Figure 3:
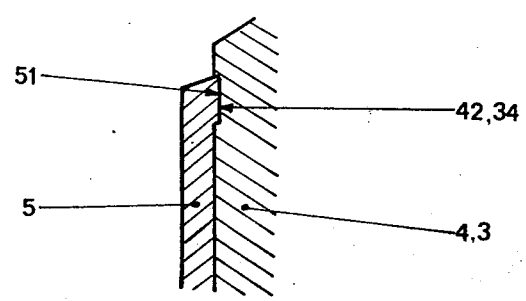

United States Patent [19]

Amyot

[11] 4,060,251
[45] Nov. 29, 1977

[54] CHUCK WITH KEY TIGHTENING

[75] Inventor: Claude Amyot, Les Gras, France

[73] Assignee: Establissements Amyot S.A., Pontarlier, France

[21] Appl. No.: 547,590

[22] Filed: Feb. 6, 1975

[30] Foreign Application Priority Data

Feb. 19, 1974 France .................. 74.05528

[51] Int. Cl.² .............................................. B23B 31/04
[52] U.S. Cl. ......................................... 279/62; 279/61
[58] Field of Search ..................... 279/60, 61, 62, 63, 279/64, 65

[56] References Cited

U.S. PATENT DOCUMENTS

| | | | |
|---|---|---|---|
| 2,432,350 | 12/1947 | Stoner | 279/62 X |
| 2,458,626 | 1/1949 | Norige | 279/62 |
| 3,462,164 | 8/1969 | Wightman | 279/62 |
| 3,680,877 | 8/1972 | Happe | 279/62 |
| 3,712,632 | 1/1973 | Wightman et al. | 279/62 X |
| 3,810,642 | 5/1974 | Derbyshire | 279/62 |
| 3,883,943 | 5/1975 | Dietzen | 279/62 X |
| 3,910,589 | 10/1975 | Derbyshire | 279/61 |
| 3,938,817 | 2/1976 | Rohm | 279/61 |

FOREIGN PATENT DOCUMENTS

| | | | |
|---|---|---|---|
| 510,264 | 10/1930 | Germany | 279/62 |
| 1,255,450 | 11/1967 | Germany | 279/62 |
| 1,398,973 | 6/1975 | United Kingdom | 279/62 |

Primary Examiner—Richard B. Lazarus
Assistant Examiner—W. R. Briggs
Attorney, Agent, or Firm—Parmelee, Johnson & Bollinger

[57] ABSTRACT

A chuck with key tightening, for a machine such as an electric drilling machine, comprising gripping means for gripping a tool such as jaws, which are guided in a translatory movement in grooves which are inclined with respect to the longitudinal axis of the chuck and which are machined in the chuck body, the chuck being characterized in that it comprises a toothed ring to which a tightening nut is connected, the nut cooperating with the threads of the gripping means, the toothed ring being provided in the region of its teeth with at least one retaining region whose internal diameter is smaller than the external diameter of the tightening nut, at least one component or at least one group of components having the same function, movable with respect to the chuck body, that is to say, the jaws and/or the nut and/or the toothed ring, being of sintered metal. The chuck is particularly advantageous for use on a percussion drilling machine, if desired, because the features of construction prevent its components from becoming disconnected.

8 Claims, 4 Drawing Figures

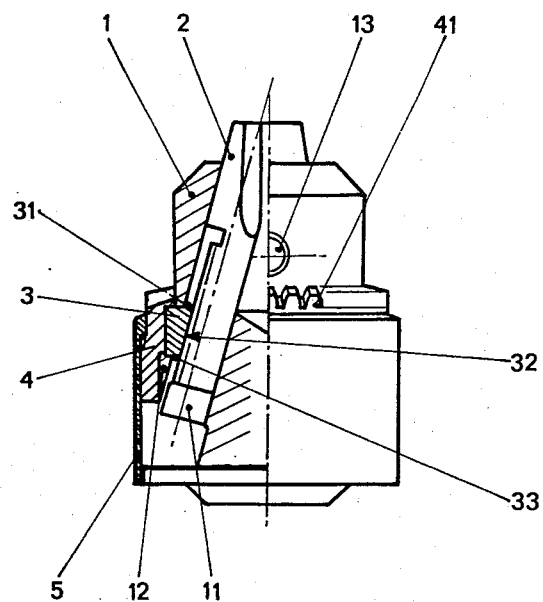
Fig_1
Fig_2
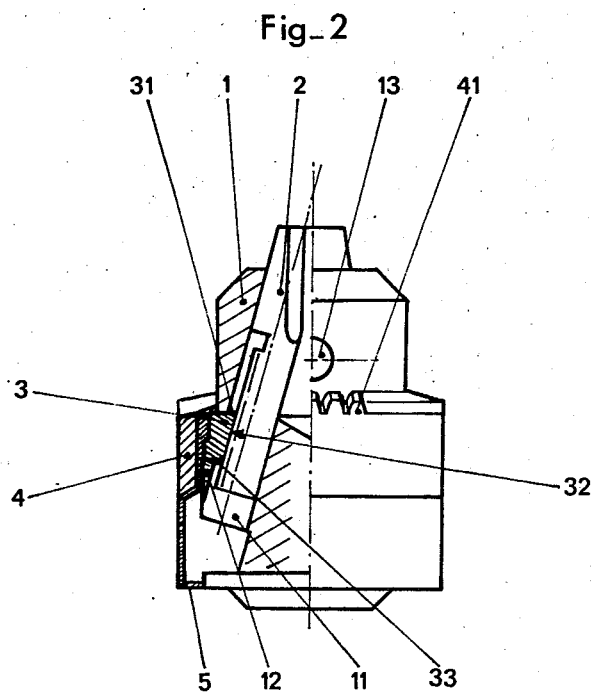

CHUCK WITH KEY TIGHTENING

The invention concerns a chuck with key tightening, intended for use on a machine such as an electric drilling machine.

Such chucks are already known but, for them to be used on a percussion drilling machine, they require a certain number of particular steps to be taken. These steps result in a chuck which is of high cost, on the one hand because of the basic material to be used and on the other hand because of the machining times required, in order to avoid the dangers of a certain number of components becoming disassembled from each other, when the chuck is used for percussion drilling purposes.

The aim of the present invention is to overcome these disadvantages, and the invention therefore seeks to provide a chuck which can be tightened by means of a key and which is easy to use and enjoys good operational safety.

For this purpose, the invention concerns a chuck with key tightening, for a machine such as an electric drilling machine, comprising gripping means for gripping a tool, such as jaws which are guided in a translatory movement in grooves which are inclined with respect to the longitudinal axis of the chuck and which are machined in the chuck body, the chuck being characterised in that it comprises a toothed ring to which a tightening nut is connected, the nut co-operating with the threads of the gripping means, the toothed ring being provided in the region of its teeth with at least one retaining region whose internal diameter is smaller than the external diameter of the tightening nut.

The resulting configuration of the toothed ring provides a high degree of operational safety.

In accordance with another feature of the invention, the tightening nut is made in at least two parts, to facilitate assembly thereof.

Figure 4:
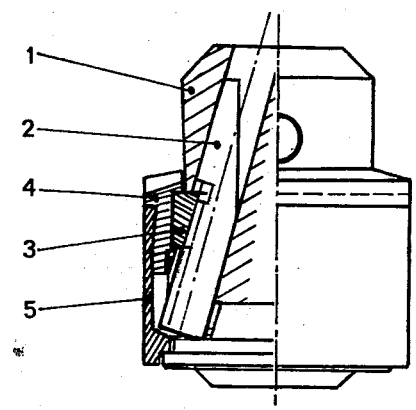

A chuck according to the invention is shown by way of non-limiting example in the accompanying drawings, in which:

FIG. 1 shows a view in longitudinal section of a first embodiment of a chuck according to the invention, FIG. 2 shows a view in longitudinal section of a second embodiment of a chuck according to the invention, FIG. 3 shows a view on a larger scale of the detail of a particular portion of the chuck, FIG. 4 shows a view in longitudinal section of a fourth embodiment of a chuck according to the invention.

In the three cases illustrated, the chuck comprises a body 1 which is provided with coaxial cylindrical and frustoconical bores intended for receiving on the one hand the tool and on the other hand the spindle of the machine, and three grooves 11 for jaws 2 which are intended to grip the tool, for example a drilling tool.

The jaws 2 are actuated in a translatory movement by relative rotation of the body 1 and a tightening nut 3 which has a front face 31 disposed at the tool side of the chuck and which has a frustoconical bore 32 provided with threads corresponding to those machined on the jaws 2. The longitudinal axes of the jaws 2 are at an angle of 15° to the longitudinal axis of the chuck.

The nut 3 also has a rear face 33 disposed at the machine side of the chuck, that face being in contact with a shoulder 12 of the body 1.

In the embodiment shown in FIG. 1, a toothed ring 4 is fitted in the manner of a ferrule around the nut 3; to this end, it is possible to heat the toothed ring 4 so as to make it expand and then to position said toothed ring 4 around the nut 3; when cooling, the toothed ring 4 contracts and both parts are thus strongly united together.

In its front part, at the tool side of the chuck, the toothed ring bears teeth 41 which are intended to co-operate with the peripheral teeth of a conventional tightening key having twelve teeth, the cylindrical end of which is in the form of a stud projection which is introduced into a cylindrical bore 13 such as a blind hole machined in the front part of the body 1.

In the same embodiment, a skirt member 5 is fitted onto the toothed ring 4 which then comprises a front part whose diameter is smaller than the rear part to which it is connected by way of a shoulder. The skirt member 5 is provided with an internal collar whose rearward shoulder bears against the shoulder of the toothed ring 4.

This configuration, which is used when the skirt member 5 is made of sheet metal, can be completed by clip-in locking means when the skirt member is made of plastics material.

In the latter case, an internal collar 51 on the skirt member 5 engages into a groove 42 in the toothed ring 41 (FIG. 3).

The skirt member 5 thus covers the whole of the part of the chuck which is between the front part of smaller diameter of the toothed ring 4, and the rear part of the chuck.

In the embodiment shown in FIG. 2, the skirt 5 is fitted onto the nut 3. This nut comprises a front part whose diameter is smaller than the rear part, the two parts being connected by way of a shoulder. In this case the skirt 5 also comprises a front part whose diameter is smaller than the rear part, the two parts being connected by way of an inclined shoulder.

The front region of the front part of the skirt member 5 has an internal collar whose shoulder connecting it to the bore of the skirt member 5, which is adjacent thereto, bears against the shoulder of the nut 3.

A toothed ring 4 covers the front part of the skirt member 5, the outside diameter of the toothed ring 4 being the same as the outside diameter of the rear part of the skirt 5.

This construction is used in particular when the skirt member 5 is made of sheet metal.

When the skirt member 5 is made of plastics material, its internal collar 51 comes into engagement in a groove 34 in the nut 3, as shown in FIG. 3.

Another embodiment of the chuck as shown in FIG. 4 has a skirt member 5 which is fitted around the toothed ring 4 through a slight binding. To prevent these two components becoming detached from each other, the portion of the skirt member 5 at the machine side of the chuck carries an internal shoulder which bears against a corresponding shoulder of the body 1. As shown in FIG. 4, the toothed ring 4 can have two regions of different outside diameters, the larger-diameter region being at the tool side of the chuck. The skirt 5 is fitted through a slight binding around the smaller-diameter region of the toothed ring 4. An attractive improvement provides that the portion of the toothed ring 4 which is of smaller outside diameter is conical so that, at that position, the material forming the skirt member 5 is relaxed, increasing the strength of the connection between the two components. The value of the conical angle depends on the materials used, primarily as regards the skirt member 5 (steel tube, plastics material, cast light alloy, etc). Externally, the skirt member 5 is in the form of a cylinder whose external diameter is equal to the larger external diameter of the toothed ring 4 and which comes into abutment against the external shoulder of the toothed ring.

In an alternative embodiment (not shown), the skirt member 5 can be a tube without any internal shoulder. In this case, the body 1 must have a larger external diameter in this region, so that the end of the tube member 5 at the machine side of the chuck comes into abutment against a corresponding shoulder of the body 1.

In the three cases illustrated, in the region of its teeth the toothed ring is provided with at least one retaining region having an internal diameter which is smaller than the external diameter of the tightening nut, the retaining region being disposed in front of the nut 3.

The nut 3 comprises a plurality of parts in the shape of circumferential arcs, so as to permit assembly of the nut.

So that the skirt member 5 effectively protects the mechanism of the chuck from dust and chips or turnings, it is possible to use a body 1 of large diameter which can be doubled back in its rear part, or provided with an auxiliary plug member. This latter possibility can be used in order to facilitate assembly of the skirt member 5 and to retain the same diameter for the body 1. In order to do this, it is also possible to provide an internal collar on the skirt member 5 so that the clearance between the outside of the body 1 and the inside of the skirt member 5 is small.

The features of the chuck make it possible to prevent the different components becoming disconnected from each other, particularly when used on a percussion drilling machine, and this is particularly advantageous, as any disconnection could cause the tightening nut to come apart.

In addition, the raw material cost and the machining times are substantially reduced.

Obviously the invention is not limited to the embodiments described above and illustrated in the drawings, from which other embodiments and other constructions could be envisaged without thereby departing from the scope of the invention.

I claim:

1. A chuck useful in percussion drilling and being of the type receiving a tool at the front thereof and being tightened with a key and having a chuck body, threaded tool gripping means which are guided for translatory movement in grooves in the chuck body and which are inclined with respect to the longitudinal axis of the chuck, a split tightening nut with threads engaging the gripping means, a toothed ring for engaging the key and connected to rotate the tightening nut, and a protective skirt member fixed coaxially to the toothed ring and at least partially surrounding the chuck body rearwardly of the toothed ring, the chuck being characterized by:
   a retaining shoulder on the toothed ring with a smaller diameter than the external diameter of the tightening nut, said retaining shoulder being frontward of the tightening nut,
   interfitting shoulder means for mounting the protective skirt member to prevent the skirt member from sliding rearwardly during percussion drilling,
   said interfitting shoulder means including a shoulder on the tightening nut with the protective skirt member being fitted onto said shoulder on the tightening nut,
   said protective skirt member comprising a first part of small diameter at the tool side of the chuck and a second part of large diameter at the machine side of the chuck, said parts being connected by a central shoulder region, and
   the skirt member being surrounded, at least over a portion of the length of the small diameter part, by the toothed ring.

2. A chuck adapted to be used in percussion drilling and being of the type for receiving a tool at the front thereof and being tightened with a key and having a chuck body, threaded tool gripping means which are guided for translatory movement in grooves in the chuck body and which are inclined with respect to the longitudinal axis of the chuck, a split tightening nut with threads engaging the gripping means, a toothed ring for engagement by the key and connected to rotate the tightening nut, and a protective skirt member fixed coaxially to the toothed ring and at least partially surrounding the chuck body rearwardly of the toothed ring, the chuck being characterized by:
   said tightening nut having a rearward facing surface bearing against a forward-facing shoulder of the chuck body and having a forward facing surface on the exterior thereof;
   said chuck body extending rearward to the rear end of the chuck and having a bore in its rear end for receiving the spindle of a machine for driving the chuck;
   said protective skirt member extending between said tightening nut and the rear end of the chuck body, said protective skirt member having a forward portion encircling said tightening nut with an inner shoulder abutting against said forward-facing surface of the tightening nut for preventing the protective skirt member from sliding rearward relative to said tightening nut during percussion drilling;
   said toothed ring encircling said forward portion of said protective skirt member with said forward portion thereof being sandwiched in between the tightening nut and the toothed ring; and
   said toothed ring having an inner retaining shoulder whose inner diameter is smaller than an external portion of said protective skirt member for preventing the toothed ring from sliding rearward relative to the protective skirt member during percussion drilling.

3. A chuck adapted to be used in percussion drilling and being of the type for receiving a tool at the front thereof and being tightenable with a key and having a chuck body, a plurality of threaded tool gripping means which are guided for translatory movement in grooves in the chuck body and which are inclined with respect to the longitudinal axis of the chuck, a split tightening nut with threads engaging the gripping means, a toothed ring for engagement by the key and connected to rotate the tightening nut, and a protective skirt member fixed co-axially to the toothed ring and at least partially surrounding the chuck body rearwardly of the toothed ring, the chuck being characterized by:
   said split tightening nut having a rear face bearing against a forward-facing shoulder of the chuck body;
   said toothed ring encircling the tightening nut and having an inner retaining shoulder whose internal diameter is smaller than an external portion of the tightening nut, said inner retaining shoulder being forward of and in abutment with said external portion of the tightening nut;

said toothed ring having an exterior shoulder surface thereon facing forwardly;

said chuck body extending back to the rear end of the chuck and having a bore in its rear end for receiving the spindle of a driving machine, and said chuck body near its rear end having an exterior shoulder thereon as an integral part of said body for providing a forward-facing exterior shoulder;

said protective skirt member extending between said toothed ring and said exterior shoulder near the rear end of the chuck body, said protective skirt member having a forward portion encircling said toothed ring and extending frontward over said exterior shoulder surface of the toothed ring and having an interior shoulder surface facing rearwardly and in engagement with said forward facing exterior shoulder surface of said toothed ring; and said protective skirt member having an inwardly extending shoulder at its rear end positioned forward of and bearing against said integral forward-facing exterior shoulder of said chuck body.

4. A chuck adapted to be used in percussion drilling, as claimed in claim 3, in which:

said exterior forward-facing shoulder surface on said toothed ring is conical; and said interior rearward-facing shoulder surface within said protective skirt member is conical and is in binding engagement with said conical surface of said toothed ring.

5. A chuck adapted to be used in percussion drilling, as claimed in claim 3, in which:

said integral forward-facing exterior shoulder of said chuck body near its rear end has a larger outside diameter than the outside diameter of said tightening nut and also larger than any portion of said chuck body forward of said exterior shoulder;

said inwardly extending shoulder at the rear end of said protective skirt member has a larger inside diameter than the outside diameter of said tightening nut and also larger than any portion of said chuck body forward of said exterior shoulder, whereby said protective skirt member and toothed ring can be assembled together and then the assembly of skirt member and toothed ring can be positioned about the remaining parts of said chuck by heating the toothed ring and moving the skirt rearwardly around the remaining parts of the chuck until said inwardly extending shoulder at the rear end of said skirt member bears against said exterior shoulder and then allowing the heated toothed ring to cool and shrink into strong gripping relationship around said split tightening nut.

6. A chuck useful in percussion drilling and being of the type receiving a tool at the front thereof and being tightenable with a key and having a chuck body, a plurality of threaded tool gripping means which are guided for translatory movement in grooves in the chuck body and which are inclined with respect to the longitudinal axis of the chuck, a split tightening nut with threads engaging the gripping means, a toothed ring for engagement by the key and being connected to rotate the tightening nut, and a protective skirt member fixed co-axially to the toothed ring and at least partially surrounding the chuck body rearwardly of the toothed ring, the chuck being characterized by:

said split tightening nut having a rear face bearing against a forward-facing shoulder of the chuck body;

said toothed ring encircling the tightening nut and having an inner retaining shoulder whose internal diameter is smaller than an external portion of the tightening nut, said inner retaining shoulder being forward of said external portion of the tightening nut;

said toothed ring also having an exterior conical surface which decreases in outside diameter in a forward direction;

said toothed ring also having an exterior shoulder located forward of and adjacent to said conical surface, said exterior shoulder projecting outwardly to a larger outside diameter than the adjacent portion of said conical surface for providing a first exterior shoulder facing rearwardly;

said chuck body extending back as an integral part to the rear end of the chuck and having a bore in its rear end for receiving the spindle of the driving tool;

said chuck body having an external shoulder thereon as an integral part of said body near its rear end for providing a second exterior shoulder facing forwardly;

said protective skirt member extending between said toothed ring and said rear end of the chuck body, said protective skirt member having a forward portion encircling said toothed ring and extending forward into abutment against said first exterior shoulder and said forward portion of said protective skirt member having an inner conical surface which decreases in inside diameter in a forward direction, said inner conical surface of said skirt member being in binding engagement around said exterior conical surface of said toothed ring for securing said forward portion of said skirt member to said toothed ring; and the rear portion of said protective skirt member having an inwardly extending shoulder positioned adjacent to and forward of said second exterior shoulder near the rear end of the chuck body.

7. A chuck useful for percussion drilling, as claimed in claim 6, in which:

said exterior shoulder on said toothed ring has an outer cylindrical surface larger in outside diameter than the remainder of said toothed ring; and the exterior surface of said protective skirt member is cylindrical and is flush with the outer cylindrical surface of said toothed ring.

8. A chuck useful for percussion drilling, as claimed in claim 7, in which:

said external shoulder on said chuck body near the rear end of said chuck body has a larger outside diameter than the outside diameter of said tightening nut and also larger than any portion of said chuck body forward of said external shoulder;

said inwardly extending shoulder on said rear portion of said protective skirt member has a larger inside diameter than the outside diameter of said tightening nut and also larger than any portion of said chuck body forward of said external shoulder;

whereby said protective skirt member can be pre-assembled with said toothed ring and then the pre-assembly of toothed ring plus protective skirt member can be assembled over the remaining parts of said chuck by preheating the toothed ring to expand it and then moving the protective skirt rearwardly around the remaining parts of the chuck until its inwardly extending shoulder becomes positioned immediately adjacent to the larger external shoulder on the rear end of the body and then allowing the pre-heated toothed ring to cool and contract into strong gripping relationship around said split tightening nut.

* * * * *